US012366113B2

(12) United States Patent
Scholz

(10) Patent No.: US 12,366,113 B2
(45) Date of Patent: Jul. 22, 2025

(54) CHILD SAFE TENSION CORDED SHADE

(71) Applicant: Ingo Scholz, Saint Petersburg, FL (US)

(72) Inventor: Ingo Scholz, Saint Petersburg, FL (US)

( * ) Notice: Subject to any disclaimer, the term of this patent is extended or adjusted under 35 U.S.C. 154(b) by 0 days.

(21) Appl. No.: 18/319,624

(22) Filed: May 18, 2023

(65) Prior Publication Data

US 2023/0332463 A1 Oct. 19, 2023

Related U.S. Application Data

(63) Continuation of application No. 18/045,643, filed on Oct. 11, 2022.

(60) Provisional application No. 63/331,689, filed on Apr. 15, 2022.

(51) Int. Cl.
*E06B 9/327* (2006.01)
*E06B 9/326* (2006.01)
*E06B 9/38* (2006.01)
*E06B 9/80* (2006.01)

(52) U.S. Cl.
CPC ................ *E06B 9/326* (2013.01); *E06B 9/38* (2013.01); *E06B 9/80* (2013.01); *E06B 9/327* (2013.01)

(58) Field of Classification Search
CPC ............. E06B 2009/3222; E06B 9/326; E06B 2009/3265; E06B 9/327; E06B 2009/2627; E06B 9/32; E06B 9/80; E06B 2009/583; A47H 3/10
See application file for complete search history.

(56) References Cited

U.S. PATENT DOCUMENTS 4,202,395 A * 5/1980 Heck ......................... E06B 9/68 160/279
5,577,543 A 11/1996 Jelic
5,906,233 A 5/1999 May
(Continued)

FOREIGN PATENT DOCUMENTS

DE 102011053648 A1 * 3/2013 ............. E06B 9/262
DE 202017105399 U1 * 1/2019
(Continued)

OTHER PUBLICATIONS

WO2023025841 machine translation (Year: 2023).*
(Continued)

*Primary Examiner* — Daniel P Cahn
*Assistant Examiner* — Jeremy C Ramsey
(74) *Attorney, Agent, or Firm* — Dunlap Bennett & Ludwig, PLLC; Anna L. Kinney

(57) ABSTRACT

A tension corded, top down/bottom up shade assembly has a fabric shade mounted between two siderails. The siderails have endcaps at each end. The shade is suspended from two of the endcaps. The shade has a top rail and a bottom rail with laterally protruding extended cord slides. The siderails have a sidewall with a front wall portion and a rear wall portion. Integral interior walls extend from the front and rear walls, forming a gap to a longitudinal cord passage. The cord passages face each other. Each endcap has a flat surface with a mounting base having lateral protrusions, end slides that fit snugly within the cord passage, and a mounting shoe stop. Mounting shoes attached to the shade each have a grooved body mounted to the mounting base. The cord slides extend through the gaps and keep cords plumb inside each cord passage and out of children's reach.

20 Claims, 5 Drawing Sheets

(56) References Cited

U.S. PATENT DOCUMENTS

| | | | | |
|---|---|---|---|---|
| 7,325,279 | B2 | 2/2008 | Huang | |
| 7,793,700 | B2 | 9/2010 | Bossler | |
| 8,316,911 | B2 | 11/2012 | Cleaver | |
| 8,776,859 | B2 | 7/2014 | Frederick | |
| 8,894,000 | B2 | 11/2014 | Belyea et al. | |
| 9,366,078 | B2 | 6/2016 | Choi et al. | |
| 9,810,018 | B1 | 11/2017 | Jaggli | |
| 2005/0028944 | A1 | 2/2005 | Early et al. | |
| 2007/0267152 | A1* | 11/2007 | Fan | E06B 9/262 160/84.06 |
| 2010/0065227 | A1 | 3/2010 | Murphy | |
| 2010/0299882 | A1 | 12/2010 | Brylko | |
| 2011/0132555 | A1 | 6/2011 | Rowley et al. | |
| 2011/0214258 | A1 | 9/2011 | Seymour et al. | |
| 2014/0048217 | A1 | 2/2014 | Hsu et al. | |
| 2015/0300083 | A1 | 10/2015 | Manske | |
| 2016/0168907 | A1 | 6/2016 | Byun | |
| 2019/0048658 | A1 | 2/2019 | Garcia Hernandez | |
| 2019/0345760 | A1 | 11/2019 | Dwarka | |
| 2021/0381308 | A1* | 12/2021 | Li | E06B 9/326 |
| 2023/0128227 | A1* | 4/2023 | Noyan | F16G 11/00 160/84.05 |
| 2023/0313603 | A1* | 10/2023 | Nelissen | E06B 9/266 160/84.01 |

FOREIGN PATENT DOCUMENTS

| | | | | |
|---|---|---|---|---|
| DE | 202022106449 | U1 * | 1/2023 | |
| DE | 202023102018 | U1 * | 9/2024 | E06B 9/327 |
| EP | 2216485 | A2 * | 8/2010 | E06B 9/262 |
| EP | 2439375 | A2 * | 4/2012 | E06B 9/262 |
| EP | 2592212 | A1 * | 5/2013 | E06B 9/323 |
| EP | 3330476 | A1 * | 6/2018 | E06B 9/327 |
| EP | 3409873 | A1 * | 12/2018 | E06B 9/266 |
| TW | M418166 | U | 12/2011 | |
| WO | WO-2023025841 | A1 * | 3/2023 | |

OTHER PUBLICATIONS

EP2592212 machine translation (Year: 2013).*
EP2216485 machine translation (Year: 2010).*
DE102011053648 machine translation (Year: 2013).*
DE202017105399 machine translation (Year: 2018).*
Machine translation of EP3330476 (Year: 2018).*
Machine translation of DE202022106449 (Year: 2023).*
Machine translation DE202023102018 (Year: 2024).*
International Search Report and Written Opinion; PCT/US2022/054117; Mailed Mar. 15, 2023.

* cited by examiner

CHILD SAFE TENSION CORDED SHADE

CROSS-REFERENCE TO RELATED APPLICATION

This application is a continuation of U.S. application Ser. No. 18/045,643, filed Oct. 11, 2022, which claimed the benefit of priority of U.S. provisional Application No. 63/331,689, filed Apr. 15, 2022. The contents of both application Ser. Nos. 18/045,643 and 63/331,689 are herein incorporated by reference.

BACKGROUND OF THE INVENTION

The present invention relates to window coverings and, more particularly, to a child safe tension corded shade assembly.

Tension corded shades have two continuous cords for bottom-up top-down operation. These cords are generally exposed to either side of the shade and easily reachable by children. Toddlers and young children can get their head caught in the cords and injure or strangle themselves.

Stronger child safety regulation in window coverings has driven the development of new child protection features for tension cord shades. There is currently no commercially available tension corded shade product that can comply with the most recent regulations, i.e., that can keep the strings out of children's reach. There are U-profiles on the market that enclose a shade on the sides or top. However, the cord is fully accessible within the U-profile. None of these products prevents a child from getting to the cord when the shade is open.

As can be seen, there is a need for a tension corded shade assembly that keeps the cords out of reach of children.

SUMMARY OF THE INVENTION

In one aspect of the present invention, a tension corded, top down/bottom up shade assembly comprises a fabric shade having a top rail and a bottom rail; extended cord slides laterally protruding from the top rail and the bottom rail; a first siderail and a second siderail each having a sidewall with a front wall portion and a rear wall portion extending therefrom, and integral interior walls extending from the front wall portion and the rear wall portion, forming a gap therebetween, wherein the sidewall, the front wall portion, the rear wall portion, and the integral interior walls form a longitudinal cord passage, wherein the longitudinal cord passages face each other and the fabric shade is mounted therebetween; endcaps coupled to a first end and a second end of each siderail, each endcap having a planar surface from which extends (i) an integral mounting base having lateral protrusions, (ii) integral end slides configured to fit snugly within the longitudinal cord passage; and (iii) an integral mounting shoe stop; mounting shoes, attached to the fabric shade, each mounting shoe having a body, defining a mounting groove therein, mounted to the integral mounting base; and a cord inside each longitudinal cord passage; wherein the fabric shade is suspended from two of the endcaps and the cord slides extend through the gaps and are operative to keep the cords plumb within the longitudinal cord passage.

The present invention is a totally new approach to child safety with tension corded bottom-up top-down shades. It prevents a toddler or child from grabbing a string and putting it around his or her neck or extremities, preventing injury and strangulation. The cords are out of toddler's/children's reach in any position of the shade.

These and other features, aspects and advantages of the present invention will become better understood with reference to the following drawings, description, and claims.

DETAILED DESCRIPTION OF THE INVENTION

Figure 1:
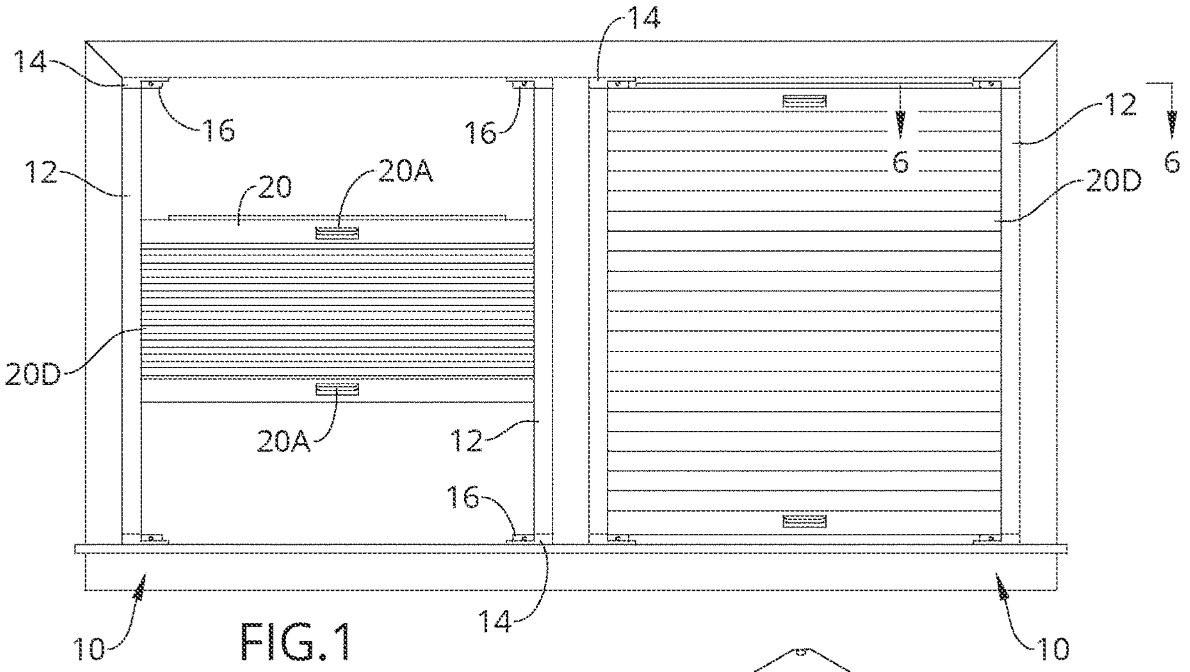
FIG. 1 is a front elevation view of continuous tension bottom-up, top-down shades with concealed cords according to an embodiment of the present invention, shown in use.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, one embodiment of the present invention is a child safe tension corded shade assembly with capped siderails for tension corded bottom-up top-down shades.

The inventive assembly is sometimes referred to herein as "U-Guard Plus". The U-Guard Plus siderails bracket the shade longitudinally (i.e., vertically). The U-Guard Plus siderail has a distinctive profile comprising two inner integrated walls with a small gap or shade guide between them. The length of the siderail is a function of the height and/or length of the shade. During installation, the cords of the shade are routed behind the siderail inner walls so that they are not accessible by children.

The cords of a shade must be fully plumb to achieve a bottom-up top-down operation. If the cords are slightly off plumb, the shade will not move properly up or down. The inventive shade assembly has extended cord slides or sliding brackets that extend the cords further away from the shade, keeping the strings fully plumb behind the siderail walls while the shade moves up and down inside the rails. The extended cord slide is installed into the rail of the shade component.

The endcaps are configured to fit snugly onto the siderail. The shades hang directly inside the U-Guard Plus assembly on the end caps. The end caps may be configured to fit any suitable base.

Each mounting bracket or mounting shoe is attached to a cord end from an extended cord slide. The mounting shoe may have an integrated magnet to maintain the shade in a closed condition. The mounting shoe slides over a mounting base integrated into the endcap and clips behind a shoe lock of the endcap.

The shade may be any shade known to one of skill in the art in top-down/bottom-up shades. The shade may be, for example, a pleated fabric blind or a fabric honeycomb shade.

The shade may be installed as follows. An installer may snap or clip the endcaps onto each end of each U-Guard Plus siderail with integrated installation bases. With the U-Guard Plus siderail openings facing each other, the installer may slide mounting brackets, attached to the shade, over the integrated bases of the endcaps. The mounting bracket ensures the installer hangs the shade correctly, i.e., in a predetermined configuration, and positions the cords inside the walled portion of the siderails, secured out of children's reach. The U-Guard Plus assembly may be mounted to a window or window trim, with shade pleats oriented horizontally, and installed to any jamb, casing, or glass pane with a fastener such as adhesive or screws. Fastening hardware, such as screws, may also be used to hold components together and/or to keep components tight. The installed shade may be safely used around children.

The means of regulating movement and position of the shades are not particularly limited and may include any suitable means known in the art.

The materials of manufacture are not particularly limited and may include, for example, plastic, such as unplasticized polyvinyl chloride (UPVC), aluminum, steel, other metals, and any combination thereof. The end caps may be manufactured of, e.g., steel, plastic, or aluminum. The U-Guard Plus siderail may be made from a metal such as aluminum or a plastic with walls having any suitable thickness, e.g., from about 0.5 mil to about 1 mil thickness. The U-Guard Plus assembly material of manufacture, dimensions, and additional structural features, such as lips, grooves, and edges, may be optimized.

Referring to FIGS. 1 through 8, FIG. 1 illustrates a continuous tension bottom-up, top-down shade assembly 10 according to an embodiment of the present invention, comprising pleated shades 20 slidably mounted between vertical U-guard rails 12. The rails 12 have endcaps 14 with mounting shoes 16 held therein, as more clearly seen in FIGS. 2 through 9. The shades comprise a vane 20D suspended between a top rail and a bottom rail, each of which has a grip or a pull 20A.

Figure 2:
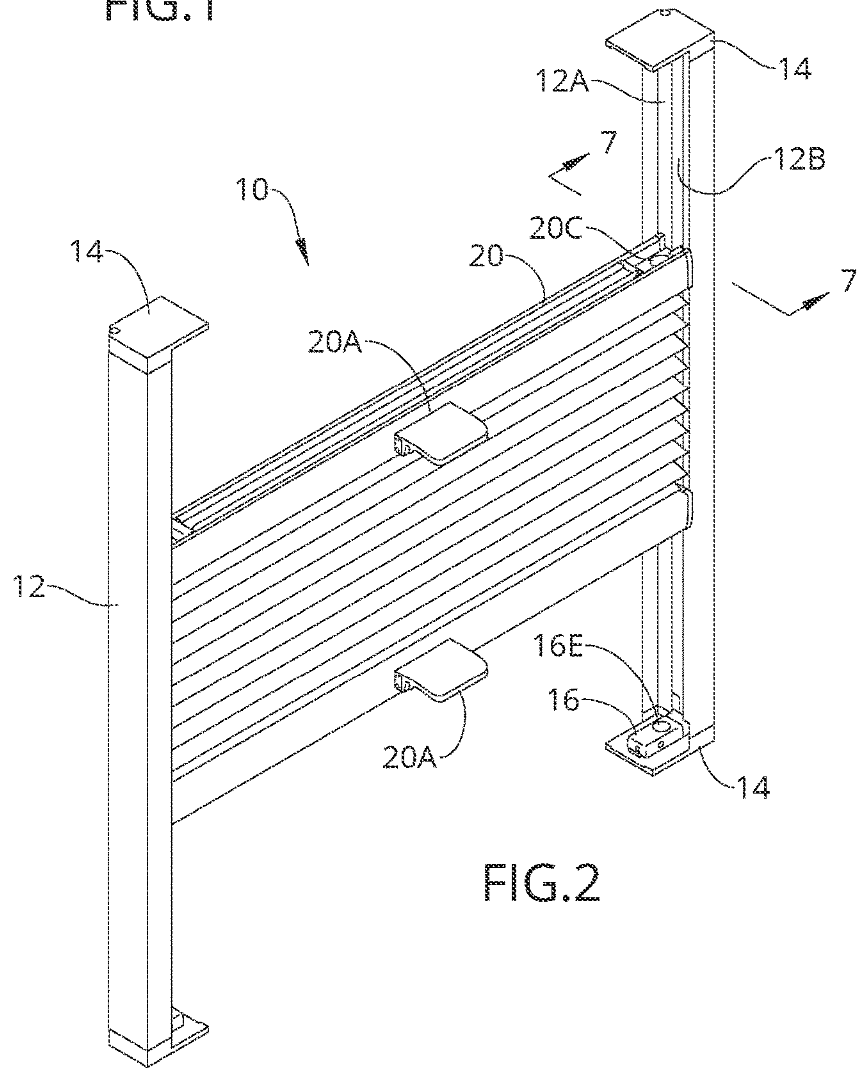
FIG. 2 is a perspective view thereof.
Figure 4:
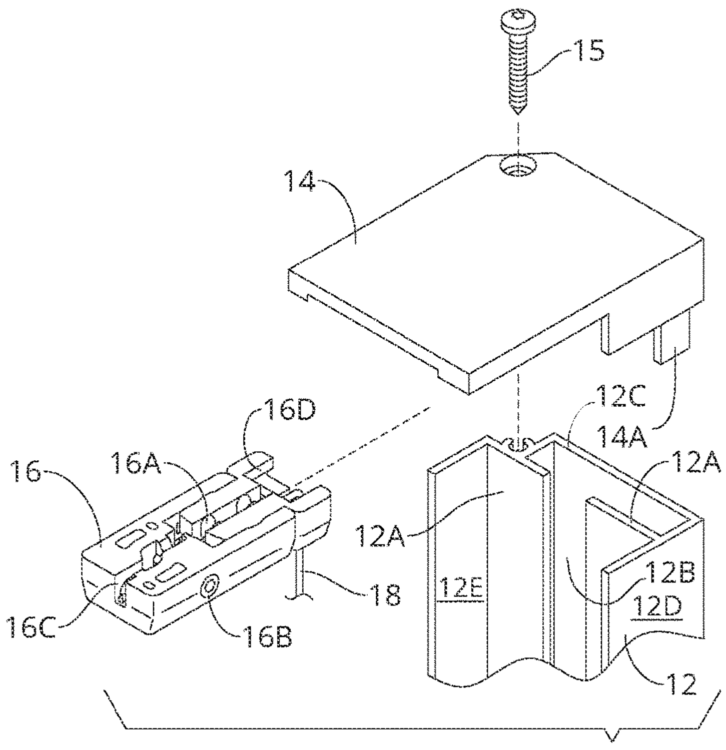
FIG. 4 is a detail top perspective exploded view thereof.

As seen in FIGS. 2 and 4, each U-guard rail 12, i.e., a first siderail and a second siderail, has a sidewall 12C with a perpendicular front wall portion 12D and a perpendicular rear wall portion 12E forming an open region therebetween. An integral interior wall 12A parallel to the sidewall 12C extends from the front wall portion 12D and the rear wall portion 12E, forming a shade guide or gap 12B therebetween. The mounting shoes 16 each have a shoe magnet 16E and the top and bottom rails have mating shade magnets 20C.

Figure 3:
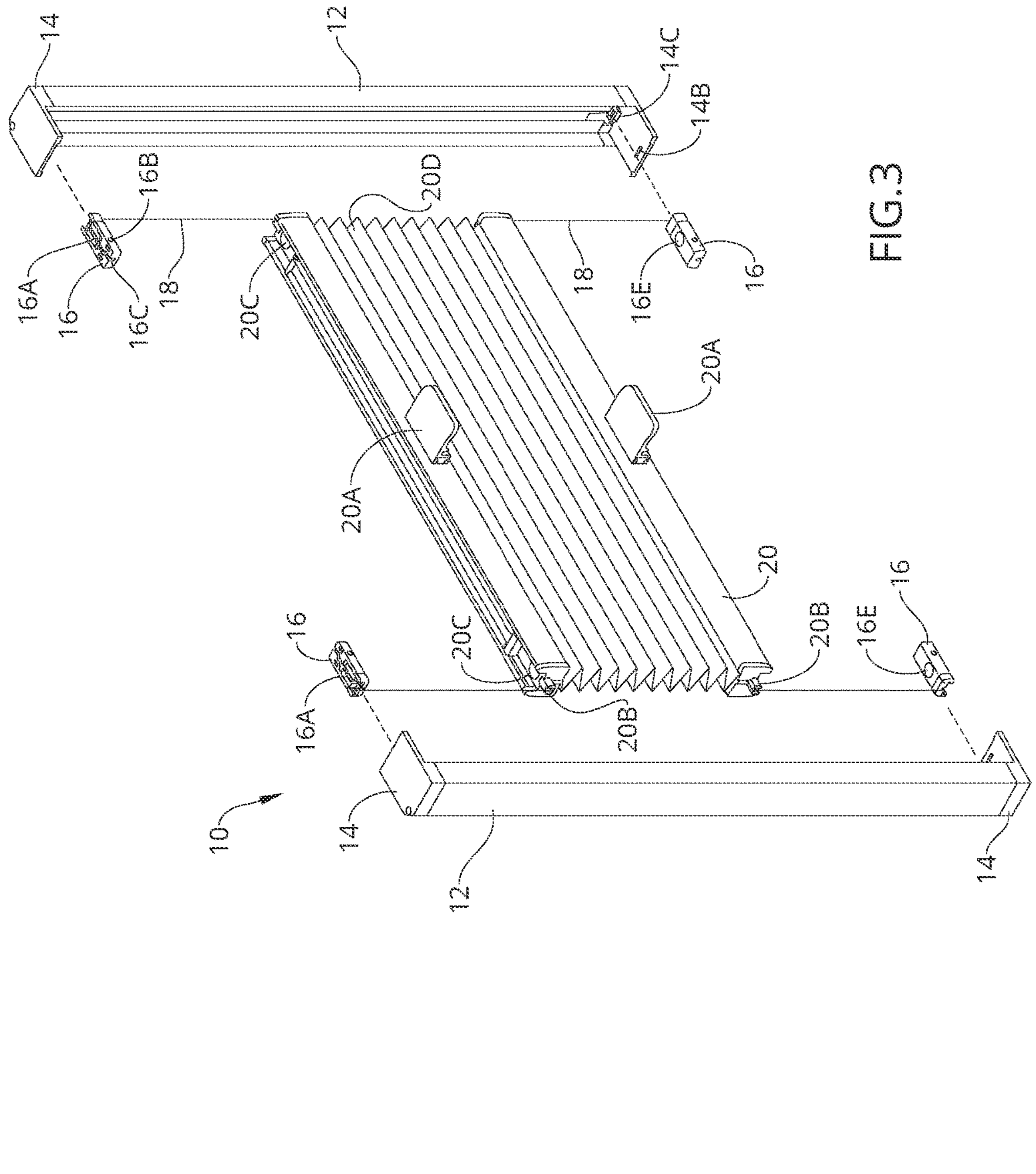
FIG. 3 is an exploded perspective view thereof.

The interior walls 12A contain cords 18 within a partitioned compartment or longitudinal cord passage within the rail 12 so they are inaccessible to children, as shown in FIG. 3. The cords 18 extend from slot inserts/cord guides 20B in the top rail and the bottom rail and are thus spaced laterally from the shades 20. A portion or recessed region of the rear sidewall is spaced from the interior walls. Each U-guard rail 12 has an end cap 14 on each end to which a mounting shoe 16 is slidably mounted. The end caps 14 each have an integral shoe lock 14B protruding from a horizontal planar surface and an integral mounting base 14C extending parallel to the horizontal planar surface. The shoes 16 slide onto a mounting base 14C and latch into place behind a shoe lock 14B.

Figure 5:
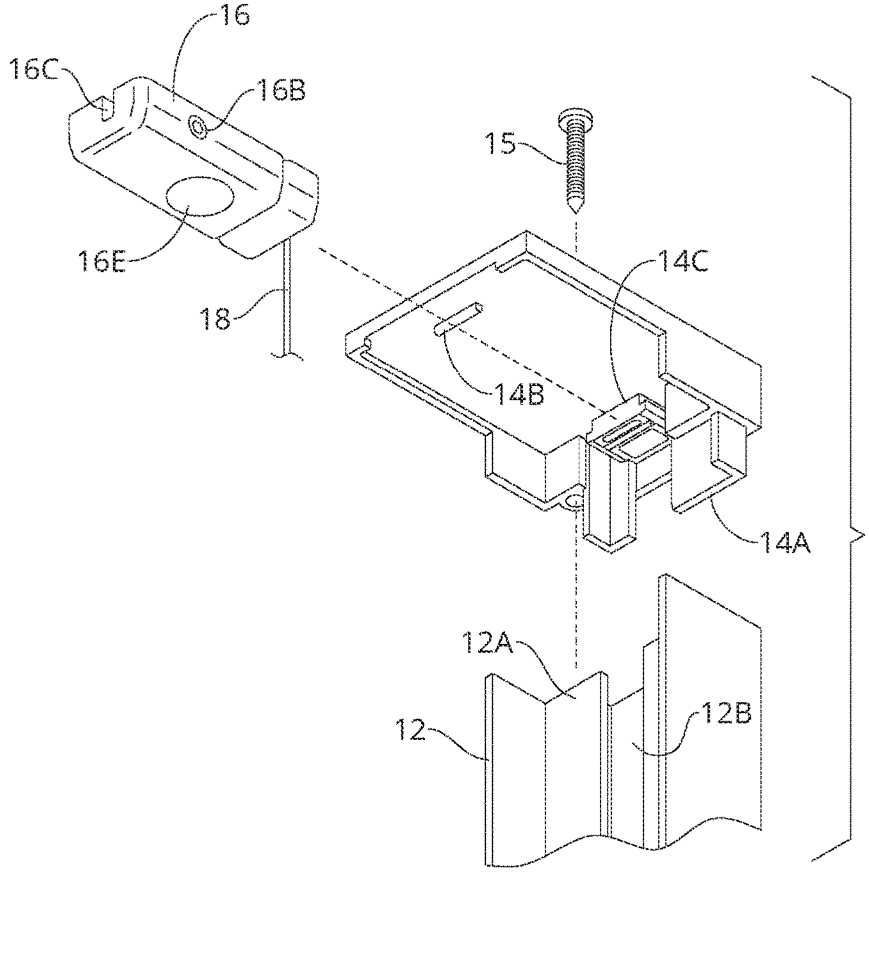
FIG. 5 is a detail bottom perspective exploded view thereof.
Figure 6:
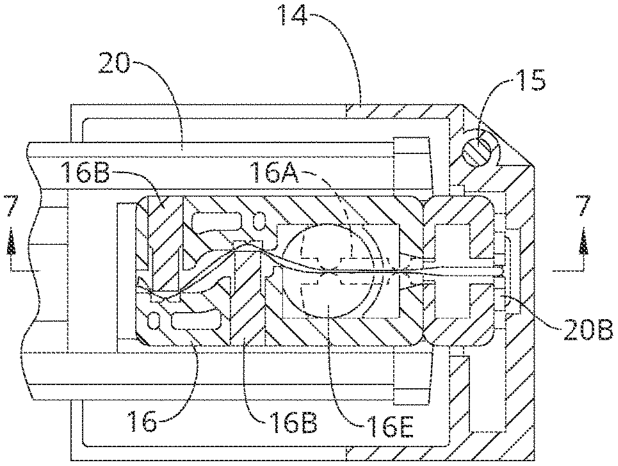
FIG. 6 is a sectional view thereof, taken along line 6-6 of FIG. 1.

As more clearly shown in FIGS. 4 and 5, the cords 18 pass through a front cord guide 16A and a rear cord channel 16C in each mounting shoe 16 and may be tightened or loosened with cord set screws 16B. The mounting shoes 16 each have a mounting slot 16D that accommodates the respective mounting base 14C. Each end cap 14 has integral rail inserts 14A that fit snugly within the cord passage, holding the end cap 14 in place behind the interior walls 12A. Cap screws may also be used to secure the end caps 14 on the rails 12.

Figure 7:
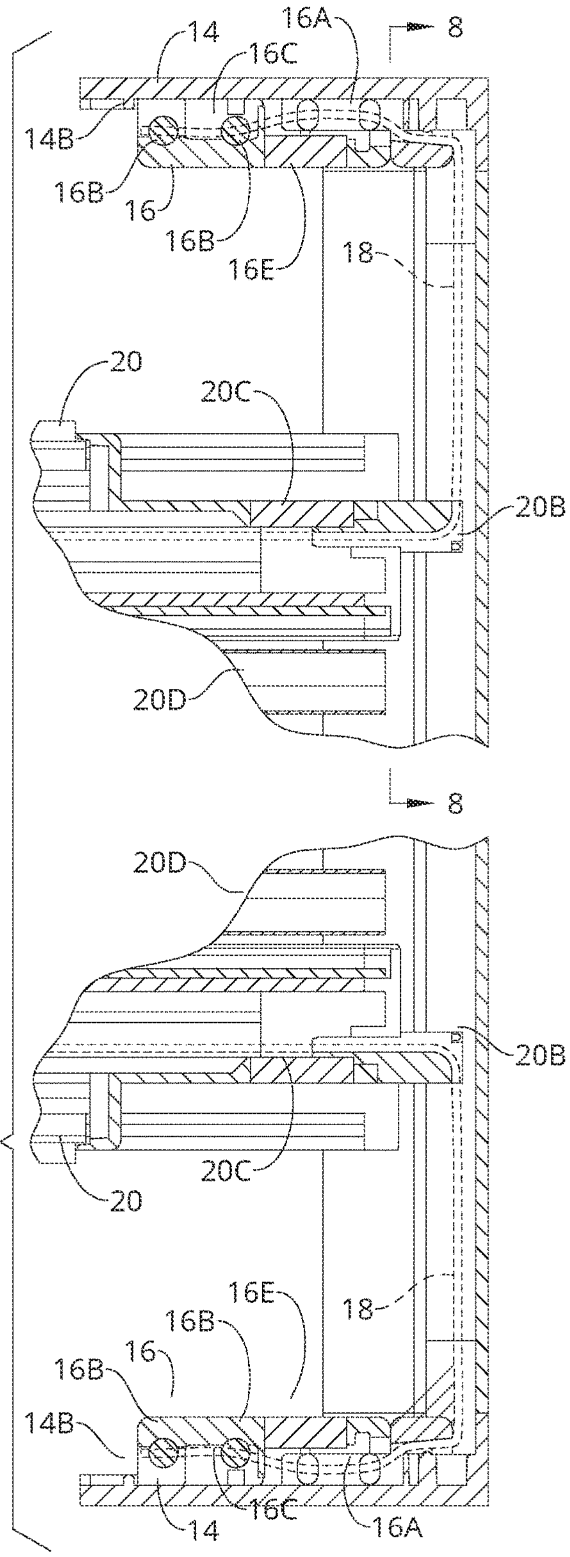
FIG. 7 is a sectional view thereof, taken along line 7-7 of FIG. 6.
Figure 8:
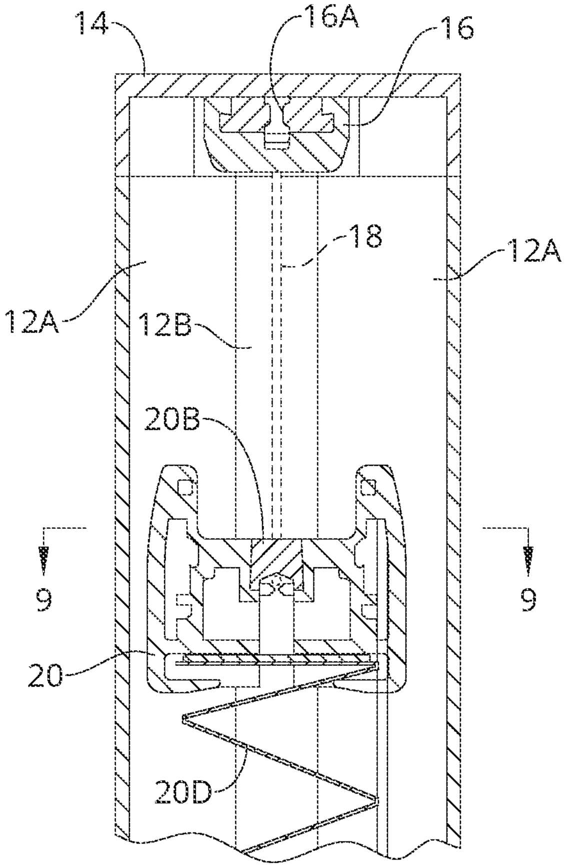
FIG. 8 is a sectional view thereof, taken along line 8-8 of FIG. 7.
Figure 9:
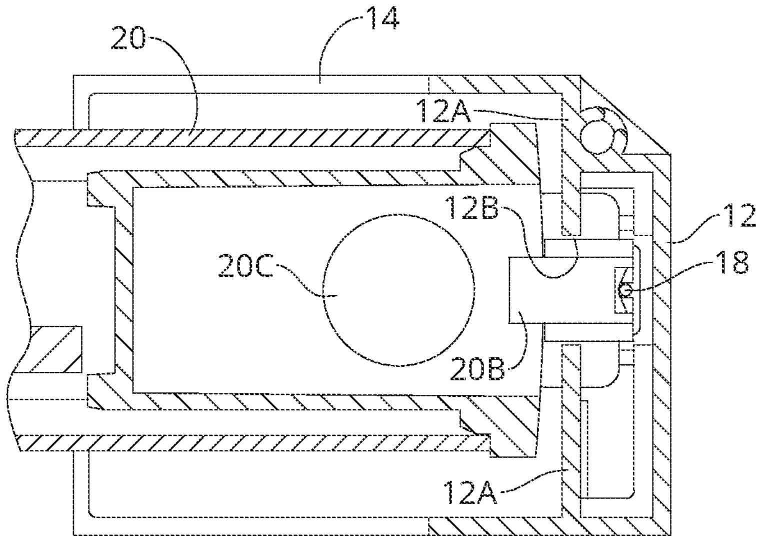
FIG. 9 is a sectional view thereof, taken along line 9-9 of FIG. 8.

The mounting shoes 16, end caps 14, and cord guides 20B are shown in more detail in FIGS. 6 through 9. FIGS. 7 and 8 more clearly illustrate the position of the cords within the shade guide 12B behind the interior rail walls 12A.

It should be understood, of course, that the foregoing relates to exemplary embodiments of the invention and that modifications may be made without departing from the spirit and scope of the invention as set forth in the following claims.

What is claimed is:

1. A top down and bottom up tension corded, pleated blind assembly, comprising:
- a pleated blind with a top rail and a bottom rail;
- extended cord guides laterally protruding from the top rail and the bottom rail;
- a first siderail and a second siderail bracketing the pleated blind perpendicular to the top rail and the bottom rail, the first and second siderails each having a first end, a second end, and a respective longitudinal cord passage; wherein the first and second siderails each have a respective longitudinal gap through which the extended cord guides protrude;
- a plurality of endcaps, each of the plurality of endcaps being coupled to a respective one of the first end and the second end;
- a plurality of mounting shoes, each of the plurality of mounting shoes being mounted to one of the plurality of endcaps; and
- tension cords, each having an end fastened within one of the plurality of mounting shoes, extending longitudinally within the respective longitudinal cord passage to a respective one of the extended cord guides, bending around the respective one of the extended cord guides, and extending into the top rail or the bottom rail;
- wherein the extended cord guides extend through the respective longitudinal gap and are operative to keep the tension cords plumb within the respective longitudinal cord passage.

2. The top down and bottom up tension corded, pleated blind assembly of claim 1, wherein the first siderail and the second siderail each have a substantially rectangular cross section formed by a sidewall, a front wall, a rear wall, and interior walls parallel to the sidewall, and wherein each of the plurality of endcaps has an integral mounting shoe lock and a planar surface.

3. The top down and bottom up tension corded, pleated blind assembly of claim 2, wherein the plurality of endcaps, the first siderail, and the second siderail are formed of a material selected from the group consisting of: a metal, a plastic, and a combination thereof.

4. The top down and bottom up tension corded, pleated blind assembly of claim 2, wherein the interior walls have a thickness of from about 0.5 mil to about 1 mil.

5. The top down and bottom up tension corded, pleated blind assembly of claim 2, wherein the rear wall is stepped such that a portion thereof is spaced from the interior walls.

6. The top down and bottom up tension corded, pleated blind assembly of claim 1, wherein the top rail and the bottom rail each have a centrally located grip.

7. The top down and bottom up tension corded, pleated blind assembly of claim 2, further comprising fastening hardware threadedly attaching each of the plurality of endcaps to one of the first and second siderails.

8. The top down and bottom up tension corded, pleated blind assembly of claim 2, wherein each of the plurality of mounting shoes is mounted to a mounting base in one of the plurality of endcaps.

9. The top down and bottom up tension corded, pleated blind assembly of claim 8, wherein each of the mounting shoes has a cord channel longitudinally therethrough.

10. The top down and bottom up tension corded, pleated blind assembly of claim 8, wherein the plurality of mounting shoes have mounting shoe magnets and the top rail and the bottom rail have rail magnets mated to the mounting shoe magnets.

11. The top down and bottom up tension corded, pleated blind assembly of claim 8, further comprising fastening hardware threadedly securing the tension cords within the mounting shoes.

12. A pleated blind system, comprising:

a top rail and a bottom rail, between which a repositionable shade is attached, and further comprising:

a side rail attached perpendicular to the top rail and the bottom rail;

wherein the top rail is fastened on a first tension cord and the bottom rail is fastened on a second tension cord;

wherein the first tension cord and the second tension cord enable the top rail and the bottom rail to be freely displaced along a length of the side rail independently of one another; and a mounting shoe at an end of the first tension cord opposite the top rail or the second tension cord opposite the bottom rail, wherein further the mounting shoe can be attached directly or indirectly inside the side rail, characterized in that a first extended cord guide is attached on an end of the top rail and a second extended cord guide is attached on an end of the bottom rail, with the first tension cord bending around the first extended cord guide and the second tension cord bending around the second extended cord guide, the first and second extended cord guides protruding through an opening in the side rail into the side rail to guide the top rail and the bottom rail along the side rail and to retain a portion of each of the first and second tension cords longitudinally within the side rail between the top rail and the mounting shoe or between the bottom rail and the mounting shoe; and wherein the first and second extended cord guides are operative to keep the first tension cord and the second tension cord plumb within the side rail and to keep the first tension cord and the second tension cord inaccessible to a child.

13. The pleated blind system of claim 12, characterized in that the opening extends in the side rail.

14. The pleated blind system of claim 12, characterized in that the first extended cord guide has a recess for guiding the first tension cord and the second extended cord guide has a recess for guiding the second tension cord.

15. The pleated blind system of claim 12, characterized in that an end cap for fastening the mounting shoe for the respective tension cord is attachable on at least one end of the side rail.

16. The pleated blind system of claim 12, characterized in that the mounting shoe is connectable to an end cap by a shoe lock.

17. The pleated blind system of claim 12, characterized in that a handle for adjusting height is fastened on each of the top rail and the bottom rail.

18. The pleated blind system of claim 12, characterized in that the side rail has a substantially C-shaped cross section, with at least one wall protruding beyond the substantially C-shaped cross section of the side rail toward the repositionable shade.

19. The pleated blind system of claim 12, characterized in that two side rails are included.

20. The pleated blind system of claim 12, characterized in that the pleated blind system has two side rails, four end caps, and four mounting shoes.

* * * * *